Aug. 21, 1956  H. E. BOWERS  2,759,222
MANUFACTURE OF FIBER BOARD BY EXTRUSION
Filed May 7, 1952
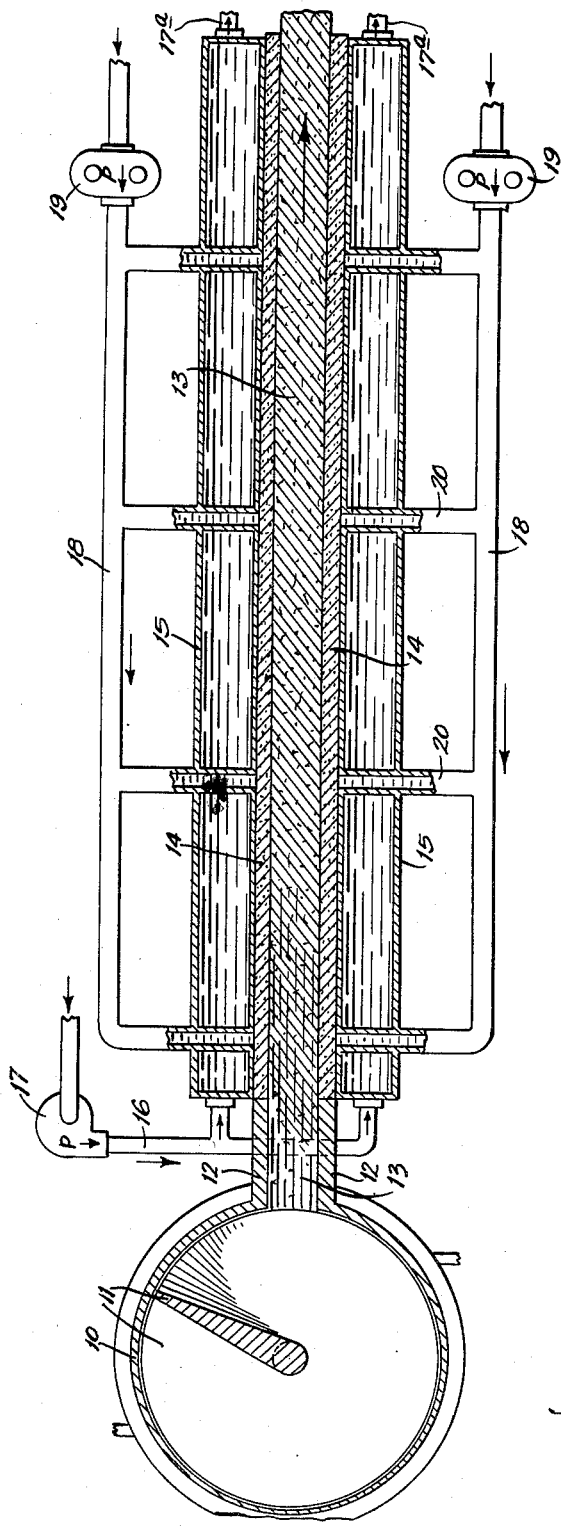
INVENTOR:
Harold E. Bowers,
BY
Dawson & Ooms,
ATTORNEYS.

United States Patent Office 2,759,222
Patented Aug. 21, 1956

2,759,222

MANUFACTURE OF FIBER BOARD BY EXTRUSION

Harold E. Bowers, Dayton, Ohio, assignor of one-half to Mathew F. Kritchever, Wilmette, Ill.

Application May 7, 1952, Serial No. 286,530

3 Claims. (Cl. 18—55)

This invention relates to the manufacture of board by extrusion. More particularly, the invention relates to the manufacture of an extruded board from wood fiber, sawdust, vegetable fibers, and other fibrous material.

An object of the invention is to provide a method and means for forming rapidly and effectively board structures while utilizing wood waste and other fibrous starting material. A further object is to provide a method and means for extruding fiber and adhesive mixtures to form sturdy boards which may be nailed or otherwise secured in structures to form efficient supports therein and having other qualities which are believed to be superior to that of ordinary lumber boards. A further object is to provide such boards in a water-repellent condition while at the same time effecting a molding of the board within the extrusion mold to a desired finished shape. Other specific objects and advantages will appear as the specification proceeds.

The process may be carried on in a variety of forms of apparatus, but for the purpose of illustration, I have set out in the accompanying drawing a schematic view, partly in section, of apparatus which may be employed effectively in the carrying out of the process.

Referring to the drawing, 10 designates an extrusion mill or cylinder adapted to receive the adhesive and fibrous material, and 11 designates a screw or auger mounted within the cylinder of the mill for forcing the mixture of adhesive and wood chips, etc. toward the outlet of the mill.

In the illustration given, the cylinder 10 is provided with an outlet. The cylinder or barrel 10 is provided with extrusion plates 12 which are spaced apart and provided with integral side walls so as to form a rectangular extrusion channel 13 for forming the board. I prefer to weld to the plates 12 elongated plates 14 of porous metal so as to form a continuous channel 13 through which the extruded board may be passed. The porous metal plates 14 may be made by the powder metallurgical process, and I prefer to employ for this purpose stainless steel or brass. It will be understood, however, that any suitable metal may be used, and since porous metal plates are known in the art, a further detailed description is herein believed to be unnecessary. In order to cool the material within the porous plates 14, I provide liquid or water jackets 15 about the plates 14 and I supply cooling liquid thereto through the pipe 16 leading from the pump 17. The cooling liquid flows from the jackets through outlet pipes 17a.

One of the difficult problems in the extrusion of boards lies in the friction that is encountered within the extrusion channels, and to meet this difficulty I provide a pressure water system employing pipes 18 leading from pump 19, and from the pipes or manifolds 18. I provide inlet pipes 20 which extend inwardly through the water jackets 15 and open on the near surface of the perforated or porous plates 14. Under the pressure of the water system, water passes through the pipes 20 and the porous plates 14 and forms a lubricating film along the surface of the formed board. The board then slides through on the film of water thus provided.

Instead of employing a screw or auger moving at right angles to the extrusion channel 13, the screw may lie in a plane in which its axis is longitudinally aligned with the channel. The extrusion channel may be formed in a variety of ways and the structure for cooling the channel may be varied as desired. About the barrel or cylinder 10 I provide a steam jacket 21 for heating the contents of the barrel.

In the structure illustrated, the extrusion channel is formed at the orifice or slot within the barrel and the orifice is parallel to the axis of the screw. With the structure shown, there is no obstruction offered to the flow of the fiber and adhesive from the barrel into the extrusion channel.

In the forming of the board, I prefer to employ starch as a binder because it is also quite useful as a lubricant. The wood fiber and starch composition is compacted within the barrel 10, the starch being gelatinized either prior to introduction in the barrel or while it is in the barrel and before extrusion. The pressure on the board must not be relaxed until the board has been cooled approximately to room temperature. If the board emerges from the compression or restraining channel-forming parts while hot, it will swell and crack and very quickly become disrupted.

Since the cooling of the board is of the utmost importance in producing a practical extrusion device, means for effective cooling must be provided and the size of the water jacket for cooling may be varied to meet the demands of the board. If the thickness of the extruded board is approximately 3/4 of an inch, the time required for cooling the board is usually about two minutes. Hence, if the extrusion rate is eight feet per minute, the cooling channel should have a length of sixteen feet. If a more rapid extrusion rate is required, then the cooling channel must be still longer so that the cooling time of about two minutes for such a board thickness may be realized. Obviously, a long channel offers considerable frictional resistance to the movement of the board. It is not an answer to overcome this resistance simply by applying more power to the screw, as this may give the board more than the desired compression. Consequently a method of lubrication is needed, and for this purpose the hydraulic means described is of value. The board is already saturated with moisture as it passes through the cooling chamber, and is not affected by direct contact with a film of water which I employ as a means of lubrication. By lining the upper and lower walls of the cooling channel with porous metal plate and forcing water under pressure through the plate, there is applied to the porous lining of the cooling vessel a film of water which enables the board to glide thereon through the channel.

As the board emerges from the cooling channel, it may move forward on a train of carrier rollers or other means. At some point on the roll train, the board will be cut into suitable lengths and these sections are preferably carried through a drying chamber or drying lehr to effect at least a partial drying. If desired, the board may be passed into the drying lehr in a direction at right angles or opposite to the direction of extrusion.

In order to prepare wood waste or other wood for use in the board-forming operation, the bark-free wood is preferably reduced to chips by passing it through a suitable mill such as a chipper. The chips, after being soaked in water, are reduced to fiber by passing them through a swing-hammer shredder. If desired, the chips or fiber may be further reduced by beating them in the presence of water in a rod-mill. Other types of fiber may be prepared in the usual manner.

To prepare a wood-starch composition for extrusion, various proportions of the starch and fiber may be employed. I prefer to use about four parts of wood (sawdust, fiber, or rod-mill pulp) with about one part of starch. I prefer to employ about 18% to 20% of starch, but fair results have been obtained using up to 25% of starch. In general, about 20% of the starch appears to be quite satisfactory. A quantity of water equal to the combined weight of wood and starch is added to the mixture, and the whole is then mixed well in a vessel which is equipped with stirring blades. If desired, the water may be added in the form of live steam injected into the wood-starch mixture. The use of steam will cause gelatinization of the starch before the composition is charged into the extrusion mill. Thereby, the flow of the wood composition through the mill is facilitated and complete gelatinization of the starch is assured. Gelatinization is necessary to the formation of the starch paste which serves as a binder and also as a lubricant. The starch cannot be gelatinized in situ in the extrusion of the board.

The wet wood-starch mixture, in the specific embodiment being described, is charged into the extrusion mill through a feed hopper. As previously indicated, the barrel 10 of the mill is surrounded by a steam jacket 21 which serves to gelatinize the starch if the gelatinization is not accomplished by the addition of steam. The heating renders the board mixture more plastic and the material flows more readily through the mill. Circulation of cooling water through the cooling jacket 15 is begun before the mill is started and hydraulic lubrication through the manifolds 18 will be started just about the time extrusion of the board begins.

While the starch-bonded board is useful in many forms of construction, it may be desired to render the board water-resistant so that it is applicable to other uses. It is not desired to render the board impervious to moisture, as this would detract from its wood-like quality and might give the wood a resinous quality. What is desired is enough waterproofing treatment to protect the starch bond again rupture and minimize swelling. To accomplish this, the board may be given a treatment with formaldehyde vapor in the present of an acid catalyst. After the board has been partially dried, it may then be passed into contact with a formaldehyde vapor in the presence of an acid catalyst to effect a waterproofing of the body of the board.

I have also found that effective waterproofing can be accomplished without using the formaldehyde vapor treatment or any additional step, through the addition of a small amount of a thermosetting resin to the batch before extrusion. After the extrusion, it is necessary only to heat the dried or partially-dried extruded board long enough to complete the setting of the resin. Because of the short period of time in which the batch passes through the extrusion mill (about two or three minutes), the resin does not have time to fully set and a final setting can be accomplished readily during the drying treatment in the lehr, etc.

Still another method for waterproofing the product is to impregnate the partially-dried board with a dilute solution of phenol-formaldehyde resin while the board is being held in the extrusion channel and between the porous plates. The board so treated is then dried and heated sufficiently to set the resin.

Specific examples of the process may be set out as follows:

*Example I*

The board-forming composition was prepared by mixing 4 parts of dry sawdust, 1 part of cornstarch (Amigold) produced by Corn Products Refining Company, and 5 parts of water. The molding composition was charged into the hopper and barrel of the extrusion mill, and a board was extruded in accordance with the procedure outlined above. Prior to the extrusion of the board, the starch was thoroughly gelatinized in the barrel. The extruded board was released from the pressure after the temperature had been reduced to approximately room temperature. The board was then dried to a moisture content of approximately 10% by passing it through a drying lehr. Thereafter the board was given a waterproofing treatment by exposing it to the action of formaldehyde vapor in the presence of an acid catalyst. The resulting board had good compressive strength and could be nailed and sawed like native wood.

*Example II*

Shredded wood fiber was prepared by passing water-soaked chips through a swing-hammer shredder. This fiber was used in a wet condition just as it came from the shredder and allowance was made for this moisture in preparing the composition. 4 parts of the wood fiber, caluculated to an air-dry basis, was mixed with 1 part of cornstarch and 5 parts of water. Live steam was injected into the mixture to raise the water content to the desired level and to bring about a gelatinization of the starch. The molding composition was charged into the extrusion mill and a board extruded as described in Example I. The board was dried and waterproofed as described in Example I, and it had greater impact strength than the sawdust board and could be nailed and sawed like natural wood. It was found useful in sub-flooring, sheathing and plywood cores, and for other applications.

*Example III*

A rod-mill pump was prepared by beating chips or shredded wood fiber in the presence of water in a rod mill. The beating time ranged from 6 to 12 hours for the fiber and a longer time for the chips. 4 parts of the rod-mill pulp, calculated to an air-dry basis, were mixed with 1 part of cornstarch. The mixture contained a large excess of water and that part which was readily filterable was removed. The residue was charged into the hopper of the extrusion mill and a board extruded in the usual manner, using cooling water and hydraulic lubrication as in Examples I and II. Similarly, the board was dried and waterproofed. The board had a fine texture and an attractive appearance. It was found useful in furniture and for decorative effects.

*Example IV*

The process was as described in Example III except that the fluid for lubricating the board as it was being cooled was air rather than water. The compressed air was about two atmospheres, and the pressure was found sufficient to lubricate the board while avoiding an air blast at the exit end of the channel.

The pressures involved in the process will vary considerably depending upon the particular material being processed. Usually a pressure between 400 and 1,000 pounds per square inch will be found satisfactory, but variations may be needed where the type of material being employed for forming the board will require greater or less pressure. In the hydraulic lubrication system, the pressure required to reduce or eliminate friction need not be as great as compacting pressure or extrusion pressure. In some instances and for certain materials, 50 pounds per square inch, more or less, will be found satisfactory. The pressure should be low enough to avoid any copious outflow of water or other lubricating liquid at the exit end of the channel. When air is used as a lubricating fluid, a pressure of one or two atmospheres is usually sufficient, but variations will occur due to the type of material being processed.

Instead of employing hydraulic lubricants or fluid lubricants as described, friction in the extrusion channel may be reduced by the use of a vibrator attached to the extrusion channel or by other means for reciprocating or causing lateral or longitudinal motion of the upper and lower surfaces of the extrusion channel.

The processes as described in the above examples have been carried on with vegetable fibers other than the wood fiber. Pith is removed from bagasse and the fiber employed in the process. Other useful fibers are those derived from corn stalks, seed-flax straw, henequen, sisal, abaca, and the wastes obtained from the processing of other fibers are utilizable in the process.

In the practice of the process described above, the starch is gelatinized, not in situ or within the board, but in a step prior to the extrusion step. The gelatinization is accomplished by the early introduction of steam or during the compacting of the fiber and starch while in the barrel or cylinder. It is found that this early gelatinization of the starch is facilitated by the hot surfaces of the screw and the walls of the mill, while at the same time the gelatinized starch is of great value as a lubricant in the passing of the mixture from the barrel into the extrusion orifice or outlet. Further, by having the gelatinization complete prior to the passing of the mixture through the extrusion nozzle, it is found that quick cooling can be brought about and the temperature of the board reduced to about room temperature before release from the extrusion channels, such reduction in temperature being vital to the preservation of the shape of the board. Through the use of the lubricating film on the inside of the porous plate, the cooling is accomplished at a rapid rate and makes the process efficient and practicable.

While in the foregoing specification I have set forth specific apparatus and specific method steps in considerable detail, it will be understood that such details of operation or means may be varied widely by those skilled in the art without departing from the spirit of my invention.

I claim:

1. A process for the extrusion of fiber board, comprising mixing water, starch and fiber in the proportions of about 5 parts of water, 4 parts of fiber, and one part of starch, heating the mixture to gelatinize the starch, mixing the gelatinized starch with the fiber, passing the mixture of fiber and legatinized starch through a cylindrical pressure channel having a longitudinally-extending side opening to extrude a board extending radially from the longitudinal center of the cylindrical channel, maintaining the board after extrusion under pressure substantially above atmospheric and while cooling the same to about room temperature, and then releasing the pressure upon said board to atmospheric pressure after it has cooled to about room temperature.

2. A process for the extrusion of fiber board, which comprises mixing water, starch and fiber in the proportions of about 5 parts of water, 4 parts of fiber and one part of starch, the starch being gelatinized, and passing the mixture under pressure through a longitudinally-extending channel having a wide opening parallel with the axis of the channel to extrude a board laterally of the side of the channel, applying a lubricant to the sides of the board after it is extruded through said side opening, maintaining the sides of the extruded board under pressure substantially above atmospheric, and cooling the board to about room temperature while the same is maintained under said pressure.

3. A process for the extrusion of fiber board, comprising gelatinizing starch in water, mixing the gelatinized starch with fiber in the proportions of about 4 parts of fiber to one part of starch, forcing the mixture of fiber and gelatinized starch by screw pressure through a cylindrical channel having a side opening extending in parallel with the axis of the channel to extrude a board radially of the channel, maintaining the extruded board under pressure substantially above atmospheric, cooling the extruded board to about room temperature, and then releasing the cooled board to atmospheric pressure.

References Cited in the file of this patent

UNITED STATES PATENTS

| | | |
|---|---|---|
| 1,370,800 | Egerton | Mar. 8, 1921 |
| 2,033,411 | Carson | Mar. 10, 1936 |
| 2,167,440 | Mason | July 25, 1939 |
| 2,306,120 | Gugger | Dec. 22, 1942 |
| 2,307,034 | Gaenzle | Jan. 5, 1943 |
| 2,335,308 | Pendergrast et al. | Nov. 30, 1943 |
| 2,342,933 | Goepfrich | Feb. 29, 1944 |
| 2,365,374 | Bailey | Dec. 19, 1944 |
| 2,489,951 | Bump | Nov. 29, 1949 |
| 2,548,095 | Bowers | Apr. 10, 1951 |
| 2,579,815 | Gialanella | Dec. 25, 1951 |
| 2,587,930 | Uschmann | Mar. 4, 1952 |
| 2,597,553 | Weber | May 20, 1952 |
| 2,649,618 | Rhodes et al. | Aug. 25, 1953 |
| 2,685,115 | Hjulian | Aug. 3, 1954 |

FOREIGN PATENTS

| | | |
|---|---|---|
| 150,019 | Australia | June 14, 1951 |